(12) United States Patent
Kotzias et al.

(10) Patent No.: US 12,505,456 B2
(45) Date of Patent: Dec. 23, 2025

(54) IDENTIFYING FAKE REVIEW SYSTEMS TO PROTECT CONSUMERS FROM FRAUDULENT E-COMMERCE WEBSITES

(71) Applicant: Gen Digital Inc., Tempe, AZ (US)

(72) Inventors: Platon Kotzias, Athens (GR); Kevin Alejandro Roundy, El Segundo, CA (US); Iskander Sanchez Rola, Antibes (FR); Michalis Pachilakis, Dublin (IE); Leylya Yumer, Antibes (FR)

(73) Assignee: GEN DIGITAL INC., Tempe, AZ (US)

( * ) Notice: Subject to any disclaimer, the term of this patent is extended or adjusted under 35 U.S.C. 154(b) by 274 days.

(21) Appl. No.: 18/349,470

(22) Filed: Jul. 10, 2023

(65) Prior Publication Data

US 2025/0005601 A1     Jan. 2, 2025

(51) Int. Cl.
*G06Q 30/018*        (2023.01)
*G06Q 30/0282*       (2023.01)

(52) U.S. Cl.
CPC ..... *G06Q 30/0185* (2013.01); *G06Q 30/0282* (2013.01)

(58) Field of Classification Search
CPC ........... G06Q 30/0185; G06Q 30/0282; G06Q 30/0609
USPC .................................................. 705/1.1–912
See application file for complete search history.

(56) References Cited

U.S. PATENT DOCUMENTS

| | | | | |
|---|---|---|---|---|
| 8,856,937 B1 * | 10/2014 | Wuest | ...................... | G06F 21/56 713/188 |
| 9,135,445 B2 * | 9/2015 | Kay | ........................ | G06F 16/95 |
| 9,729,558 B2 * | 8/2017 | Liu | ...................... | H04L 63/1441 |
| 10,089,660 B2 * | 10/2018 | Luan | ................... | G06Q 30/0282 |
| 11,330,010 B2 * | 5/2022 | Li | .......................... | H04L 63/145 |
| 2006/0069697 A1 * | 3/2006 | Shraim | ............... | H04L 63/1441 707/999.102 |
| 2016/0005050 A1 * | 1/2016 | Teman | ................. | G06Q 30/018 705/317 |
| 2016/0253484 A1 * | 9/2016 | Zhu | ..................... | G06Q 30/0185 726/23 |
| 2016/0321711 A1 * | 11/2016 | Wouhaybi | .......... | G06Q 30/0282 |

(Continued)

OTHER PUBLICATIONS

Manek, Asha S. and Shenoy, P. Deepa and Mohan, M. Chandra and Venugopal, K. R., "Detection of fraudulent and malicious websites by analysing user reviews for online shopping websites", International Journal of Knowledge and Web Intelligence, vol. 5, Issue 3, pp. 171-189, Jan. 2016. (Year: 2016).*

(Continued)

*Primary Examiner* — Jonathan P Ouellette
(74) *Attorney, Agent, or Firm* — MASCHOFF BRENNAN

(57) ABSTRACT

Systems and methods for detecting fraudulent e-commerce websites by identifying fake review systems are disclosed. In particular, some embodiments may identify an e-commerce website and download content contained on one or more product web pages of the e-commerce website. These web pages may be analyzed to identify a product review feature that is within the one or more product web pages. Attributes of the product review feature may then be evaluated to determine that the e-commerce website is fraudulent and a security action may be performed to protect consumers from the e-commerce website.

20 Claims, 5 Drawing Sheets

(56) References Cited

U.S. PATENT DOCUMENTS

| | | | |
|---|---|---|---|
| 2017/0221111 A1* | 8/2017 | Salehi | G06Q 30/0185 |
| 2019/0385200 A1* | 12/2019 | Berry | H04L 51/046 |
| 2024/0062264 A1* | 2/2024 | Trikha | G06Q 30/0625 |

OTHER PUBLICATIONS

Kassim, Mohd Nizam, Mohd Aizaini Maarof, and Majid Bakhtiari. "Fraudulent e-commerce website detection model using html, text and image features." Proceedings of the 11th International Conference on Soft Computing and Pattern Recognition (SoCPaR 2019). vol. 1182. pp. 192-202, Springer Nature, 2020. (Year: 2020).*

H. Weng et al., "CATS: Cross-Platform E-Commerce Fraud Detection," 2019 IEEE 35th International Conference on Data Engineering (ICDE), Macao, China, 2019, pp. 1874-1885, doi: 10.1109/ICDE.2019.00203. (Year: 2019).*

Carpineto, C. and Romano, G., Aug. 2017. Learning to detect and measure fake ecommerce websites in search-engine results. In Proceedings of the international conference on web intelligence (pp. 403-410).

Wadleigh, J., Drew, J. and Moore, T., May 2015. The E-Commerce Market for "Lemons" Identification and Analysis of Websites Selling Counterfeit Goods. In Proceedings of the 24th International Conference on World Wide Web (pp. 1188-1197).

Wabeke, T., Moura, G.C., Franken, N. and Hesselman, C., Mar. 2020. Counterfighting Counterfeit: detecting and taking down fraudulent webshops at a ccTLD. In International Conference on Passive and Active Network Measurement (pp. 158-174). Springer, Cham.

Price, B. and Edwards, M., May 2020. Resource Networks of Pet Scam Websites. In 2020 Symposium on Electronic Crime Research. Institute of Electrical and Electronics Engineers (IEEE).

McCoy, D., Dharmdasani, H., Kreibich, C., Voelker, G.M. and Savage, S., Oct. 2012. Priceless: The role of payments in abuse-advertised goods. In Proceedings of the 2012 ACM conference on Computer and communications security (pp. 845-856).

Citizens Advice.org; "Check if something might be a scam"; Website; located at: https://www.citizensadvice.org.uk/consumer/scams/check-if-something-might-be-a-scam/; 2023; accessed on May 8, 2023.

Thuiswinkel Waarborg; "Safe Online Shopping—Real or Fake?", Website; located at: https://www.thuiswinkel.org/en/safe-online-shopping/real-or-fake/; 2023; accessed on May 8, 2023.

Washington Post; "How to tell real products from scams when shopping online"; Website; located at: https://www.washingtonpost.com/technology/2021/10/06/online-shopping-how-to/; Nov. 28, 2022; accessed on May 8, 2023.

Qualtrics XM; "Online reviews statistics to know for 2022"; Website; located at: https://www.qualtrics.com/blog/online-review-stats/; Oct. 30, 2020; accessed on May 9, 2023.

Time Magazine; "Inside the War on Fake Consumer Reviews", Website: located at: https://time.com/6192933/fake-reviews-regulation/; Jul. 6, 2022; accessed on May 9, 2023.

* cited by examiner

IDENTIFYING FAKE REVIEW SYSTEMS TO PROTECT CONSUMERS FROM FRAUDULENT E-COMMERCE WEBSITES

CROSS-REFERENCE TO A RELATED APPLICATION

This patent application claims the benefit of and priority to European Patent Application No. EP23386051.9, filed on Jun. 27, 2023, the contents of which are incorporated by reference.

BACKGROUND

Online reviews play an important role in determining whether consumers will interact with an e-commerce website. Some studies estimate that 93% of consumers read online reviews before buying a product from an e-commerce website. There are different ways that customers can submit their online reviews. Some e-commerce websites provide their own review submission links and forms, enabling customers to leave reviews for specific products or services directly through the e-commerce website that provides the products or services. This is referred to as a "first-party review system." In first-party review systems, e-commerce website owners have full control over which reviews to actually publish on their websites. Often, negative reviews are suppressed in first-party review systems and only positive reviews are actually published.

A more transparent and trustworthy way to submit online reviews is through a third-party review platform, which is independent from the e-commerce website. In these systems, which are referred to as "third-party review systems," reviews are posted on the third-party review platform where e-commerce website owners can reply to reviews, but have no control over publication of the reviews. Often, e-commerce websites will integrate widgets from or provide links to one or more of these third-party review platforms so that potential customers can easily access the latest reviews, submitted to a third-party review platform, for a product or service offered on the e-commerce website.

Due to the import role that online reviews play, scammers that operate fraudulent online stores often integrate fake online review systems into their websites in order to convince victims to purchase the products they offer. Once purchased, the fraudulent online store may fail to deliver the purchased product, may send a product of much lower quality than what is advertised, or may send a different product altogether. These online purchase scams are responsible for millions of dollars in losses every year. Indeed, the Better Business Bureau (BBB) has consistently ranked online purchase scams as one of the top consumer risks every year. Thus, detecting these fake online review systems and identifying fraudulent e-commerce websites is essential to avoid online shopping scams.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for detecting fraudulent e-commerce websites may be performed, at least in part, by a computing device including one or more processors. The method may include identifying an e-commerce website and downloading content contained on one or more product web pages of the e-commerce website. The method may also include identifying a product review feature contained within the one or more product web pages and evaluating attributes associated with the product review feature to determine that the e-commerce website is fraudulent. Once an e-commerce website is determined to be fraudulent, a security action may be performed to protect consumers from the e-commerce website.

In some embodiments, the content downloaded contained on one or more product web pages may include images and hypertext markup language (HTML) code.

In some embodiments, the content contained on the one or more product web pages of the e-commerce website may be downloaded by crawling and indexing the content contained on the one or more product web pages. In these embodiments, a headless browser may be used to crawl the e-commerce website.

In some embodiments, the product review feature may be identified through one or more visual cues. In these embodiments, the visual cues may include a logo of a third-party review platform or a customer review box or a rating scale visual. In these embodiments the ratings scale visual may include one or more stars.

In some embodiments, the product review feature may purport to be a third-party review system, the attributes evaluated may include an integration with a third-party review platform, and the e-commerce website may be determined to be fraudulent when an integration with the third-party review platform is nonfunctional. In these embodiments, the integration with the third-party review platform may be nonfunctional when a request is not made to the third-party review system or when a requested uniform resource locator (URL) lacks a domain of the e-commerce website.

In some embodiments, the product review feature may purport to be a first-party review system, the attributes evaluated may include a functionality of a review submission feature, and the e-commerce website may be determined to be fraudulent when the review submission feature is inoperable. In these embodiments, the review submission feature may lack a review submission link.

In some embodiments, the product review feature may include a plurality of reviews, the attributes evaluated may include a ratio of high rated reviews to low rated reviews, and the e-commerce website may be determined to be fraudulent when the ratio of high rated reviews to low rated reviews exceeds a threshold.

In some embodiments, the product review feature may include a plurality of reviews, the attributes evaluated may include an average length of the plurality of reviews, and the e-commerce website may be determined to be fraudulent when the average length of the plurality of reviews falls below a threshold.

In some embodiments, the product review feature may include a plurality of reviews, the attributes evaluated may include a level of similarity of the plurality of reviews, and the e-commerce website may be determined to be fraudulent when the level of similarity of the plurality of reviews exceeds a threshold.

In some embodiments, the product review feature may include a plurality of reviews, the attributes evaluated may include a level of grammatical accuracy of the plurality of reviews, and the e-commerce website may be determined to be fraudulent when the level of grammatical accuracy of the plurality of reviews falls below a threshold.

In some embodiments, the security action may include providing a notice to a customer attempting to contact the e-commerce website that the e-commerce website may be fraudulent or preventing a customer from accessing the e-commerce website or preventing a customer from making any purchases from the e-commerce website.

In some embodiments, one or more non-transitory computer-readable media may comprise one or more computer-readable instructions that, when executed by one or more processors of a computing device, cause the computing device to perform a method for detecting fraudulent e-commerce websites.

In some embodiments, a computing device comprising one or more processors and one or more non-transitory computer-readable media comprising one or more computer-readable instructions that, when executed by the one or more processors, may cause the computing device to perform a method for detecting fraudulent e-commerce websites.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings, in which.

DETAILED DESCRIPTION

Legitimate e-commerce websites typically provide access to online reviews for products and services that they offer on their websites. These online reviews can be provided through a "first-party review system" in which the e-commerce website itself provides review submission links and forms, enabling customers to leave reviews for specific products or services directly through the e-commerce website that provides the products or services. These first-party review systems are sometimes not reliable as website owners have discretion on which reviews to publish.

Alternatively, online reviews can be provided through a "third-party review system," where reviews are posted on a third-party review platform, such as TrustPilot®, Google Reviews®, Yelp®, etc. In these third-party review systems, e-commerce website owners can reply to reviews, but have no control over publication of the reviews. Often, e-commerce websites will integrate widgets from or provide links to one or more of these third-party review platforms so that potential customers can easily access the latest reviews, submitted to a third-party review platform, for a product or service offered on the e-commerce website.

Scammers operating fraudulent online stores often attempt to simulate one or both of these online review systems in a number of different ways. For example, some scammers may create and publish a large number of fake positive reviews, thus giving potential customers the impression that the product has been not only popular, but has also been highly rated. Other scammers may simply copy the look and feel of legitimate e-commerce websites through the deceptive use of third-party review logos, inoperative review submission options, high review score symbols, etc.

Some embodiments disclosed herein may enable the detection of fraudulent e-commerce websites by identifying fake review systems. In particular, some embodiments may identify an e-commerce website and download content contained on one or more product web pages of the e-commerce website. These web pages may be analyzed to identify a product review feature that is contained within the one or more product web pages. Attributes of the product review feature may then be evaluated to determine that the e-commerce website is fraudulent and a security action may be performed to protect consumers from the e-commerce website.

Figure 1:
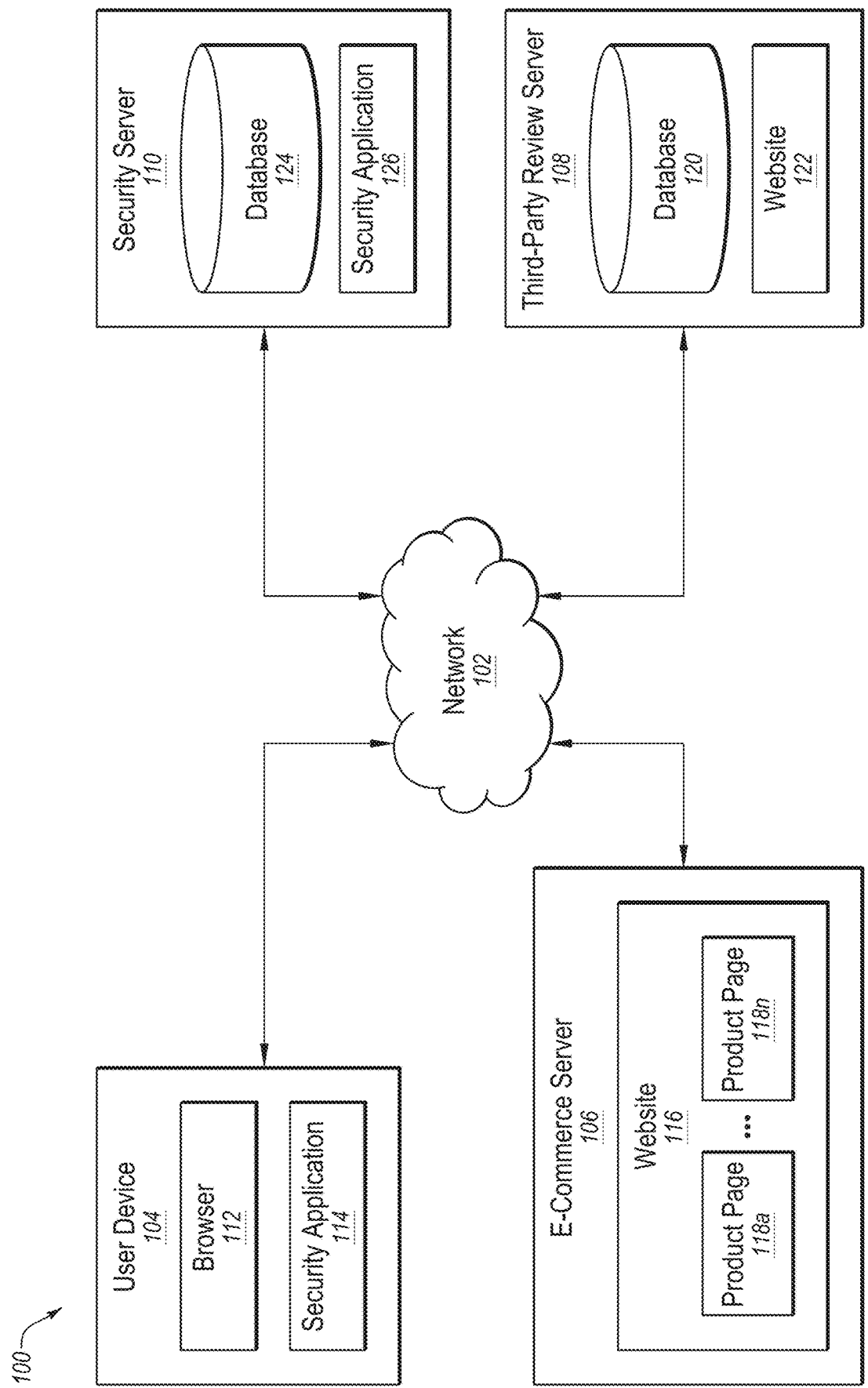
FIG. 1 illustrates an example system configured for detecting fraudulent e-commerce websites.

Turning to the figures, FIG. 1 illustrates an example system 100 configured for detecting fraudulent e-commerce websites. The system 100 may include a network 102, a user device 104, an e-commerce server 106, a third-party review server 108, and a security server 110.

In some embodiments, the network 102 may be configured to communicatively couple the user device 104, the e-commerce server 106, the third-party review server 108, and the security server 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 5:
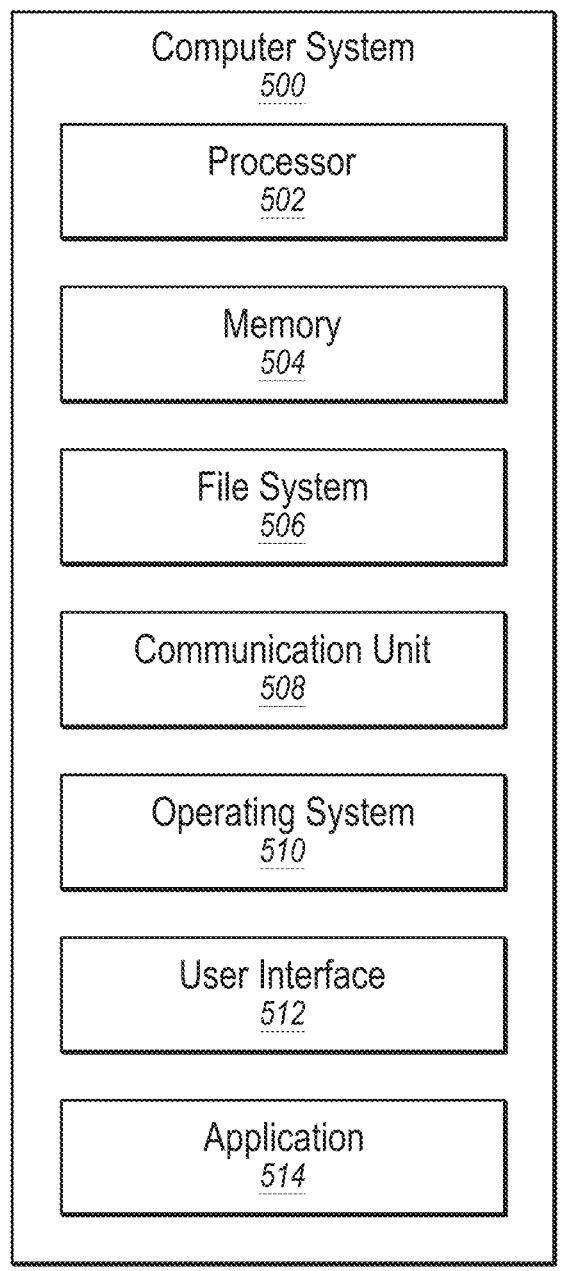
FIG. 5 illustrates an example computer system that may be employed in detecting fraudulent e-commerce websites.

In some embodiments, the user device 104 may be any computer system capable of communicating over the network 102, examples of which are disclosed herein in connection with the computer system 500 of FIG. 5. The user device 104 includes a browser 112 and a security application 114. The security application 114 may perform one or more steps for detecting fraudulent e-commerce websites.

In some embodiments, the e-commerce server 106 may be any computer system capable of communicating over the network 102, examples of which are disclosed herein in connection with the computer system 500 of FIG. 5. The e-commerce server 106 includes a website 116 and product pages 116a-116n, which may offer for sale one or more products or services.

In some embodiments, the third-party review server 108 may be any computer system capable of communicating over the network 102, examples of which are disclosed herein in connection with the computer system 500 of FIG. 5. The third-party review server 108 includes a database 120 that may store online reviews submitted by consumers over the network 102 and a website 122 that may publish one or more of the online reviews stored in the database 120.

In some embodiments, the security server 110 may be any computer system capable of communicating over the network 102, examples of which are disclosed herein in connection with the computer system 500 of FIG. 5. The security server 110 includes a database 124 and a security application 126. The database 124 may store exemplary attributes that are associated with fraudulent e-commerce websites. Like the security application 114, the security application 126 may perform one or more steps for detecting fraudulent e-commerce websites.

To detect fraudulent e-commerce websites, the security applications 114 and/or 126 may identify an e-commerce website, such as the website 116. The security applications 114 and/or 126 may download content that is contained on one or more of the product pages 118a-118n on the e-commerce website 116. The security applications 114 and/or 126 may also download content that is contained on a home page of the e-commerce website 116. Once this content is downloaded, the security applications 114 and/or 126 may identify a product review feature that is contained within the one or more of the product pages 118a-118n and/or the home page of the e-commerce website 116. The security applications 114 and/or 126 may then evaluate attributes that are associated with the product review feature and make a determination that the e-commerce website 116 is fraudulent. A security action may then be performed to protect consumers from the e-commerce website.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. For example, in some embodiments, a system for detecting fraudulent e-commerce websites may only include a single security application. In other embodiments, the steps performed by a security application may be split between two or more security applications. For example, with regard to the system 100, the security application 126 may identify the e-commerce website 116, download content contained on one or more product web pages 118a-118n of the e-commerce website 116, identify a product review feature contained within the one or more product web pages 118a-118n and evaluate attributes associated with the product review feature to determine that the e-commerce website 116 is fraudulent. The security application 114 may receive a communication from the security application 126 that the e-commerce website 116 is fraudulent, and perform a security action based on that determination. For example, the security application 114 may provide a notification on the user device 104 that the e-commerce website 116 is fraudulent and/or prevent the browser 112 from accessing the e-commerce website 116 and/or prevent a customer from making any purchases from the e-commerce website.

Figure 2:
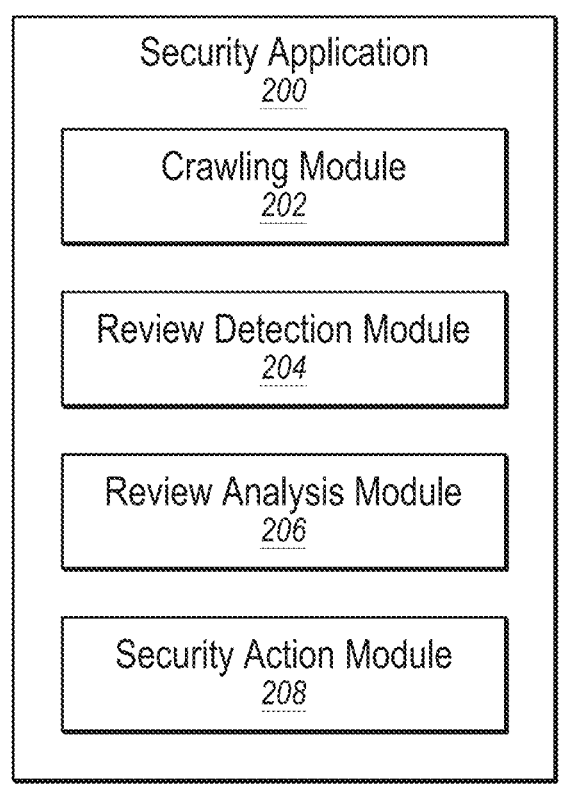
FIG. 2 illustrates an exemplary security application.

FIG. 2 illustrates an exemplary security application 200. The security application 200 may be, for example, one or both of the security applications 114 and 126 illustrated in FIG. 1. The security application 200 includes a crawling module 202, a review detection module 204, a review analysis module 206, and a security action module 208. In some embodiments, the crawling module 202 may identify an e-commerce website based on an analysis of the website. For example, if the website includes a shopping cart, the crawling module 202 may determine that the website is an e-commerce website. Once an e-commerce website is identified, the crawling module 202 may download content contained on one or more pages of the e-commerce website. For example, the crawling module 202 may download images and hypertext markup language (HTML) code from one or more product pages and/or a home page of the e-commerce website. Network communications by the e-commerce website during the loading phase of the website may also be downloaded. This downloaded content may also be indexed by the crawling module 202 and stored in a database. In some embodiments, a headless browser may be used to crawl the e-commerce website.

The review detection module 204 may identify a product review feature contained within the on one or more product web pages of the e-commerce website based on the content downloaded by the crawling module 202. In some embodiments, the product review feature may be identified through one or more visual cues. For example, the visual cues may suggest the presence of a third-party review system when the visual cues include a logo of a third-party review platform or a link to a third-party review platform website. The visual cues may suggest the presence of a first-party review system where the visual cues include an apparent customer review box where a written review for a product may be entered and submitted to the website. Alternatively, the visual cues may include a rating scale visual such as stars or a scoreboard or another visual element associated with a rating scale.

The review analysis module 206 may evaluate attributes that are associated with the product review feature(s) identified by the review detection module 204 to determine whether the e-commerce website is fraudulent. For example, where the product review feature purports to be a third-party review system (e.g., the visual cues include a logo of a third-party review platform or a link to a third-party review platform website), the attributes evaluated may include an integration with a third-party review platform. The review analysis module 206 may determine that the e-commerce website is fraudulent when an integration with the third-party review platform is nonfunctional. To make this determination, the network communications by the e-commerce website during its loading phase may be analyzed. For example, the integration with the third-party review platform may be nonfunctional when the e-commerce website fails to make any request to the third-party review system or when a requested uniform resource locator (URL) lacks a domain of the e-commerce website.

In another embodiment, where the product review feature purports to be a first-party review system (e.g., the visual cues include an apparent customer review box where a review for a product may be entered and submitted to the website), the attributes evaluated may include a functionality of a review submission feature. The review analysis module 206 may determine that the e-commerce website is fraudulent when the review submission feature is inoperable. For example, the review submission feature may be inoperable when it lacks a submission link. If an operable submission link is found, a bot may be used to interact with the review system and verify the capability of sending reviews to the website owners.

In another embodiment, the product review feature may include a plurality of reviews. The attributes of reviews evaluated may include a ratio of high rating reviews to low rating reviews. The review analysis module 206 may determine that the e-commerce website is fraudulent when the ratio of high rated reviews to low rating reviews exceeds a threshold. In another embodiment, a distribution of reviews across all possible rating levels is analyzed. Often, scammers will include an unrealistic number of very positive reviews of their products. Thus the distribution, if skewed heavily toward very positive reviews, may indicate a fraudulent website. Alternatively, if there are a large number of very positive reviews, a large number of very negative reviews, and only a small number of reviews in the middle, this also may indicate a fraudulent website.

In another embodiment, the product review feature may include a plurality of reviews and the attributes evaluated may include an average length of the plurality of reviews. The review analysis module 206 may determine that the e-commerce website is fraudulent when the average length of the plurality of reviews falls below a threshold.

In another embodiment, the product review feature may include a plurality of reviews and the attributes evaluated may include a level of similarity of the plurality of reviews. The review analysis module 206 may determine that the e-commerce website is fraudulent when the level of similarity of the plurality of reviews exceeds a threshold.

In another embodiment, the product review feature may include a plurality of reviews and the attributes evaluated may include a level of grammatical accuracy of the plurality of reviews. The review analysis module 206 may determine that the e-commerce website is fraudulent when the level of grammatical accuracy of the plurality of reviews falls below a threshold.

The security action module 208 may perform a security action to protect consumers from e-commerce websites determined to be fraudulent. In one embodiment, the security action may include providing a notice to a customer attempting to contact the e-commerce website that the e-commerce website may be fraudulent. In another embodiment, the security action may include preventing a customer from accessing the e-commerce website. In another embodiment, the security action may include preventing a customer from making any purchases from the e-commerce website.

Thus, aspects of product review features may be used to determine whether an e-commerce website is fraudulent. Once an e-commerce website is determined to be fraudulent, steps may be taken to protect the customer, or a user device belonging to the customer, from the fraudulent website.

Modifications, additions, or omissions may be made to the security application 200 without departing from the scope of the present disclosure. For example, the security application 200 may include additional components similar to the components illustrated in FIG. 2 that each may be configured similarly to the components illustrated in FIG. 2. Further, in some embodiments, the functionality of the security application 200 may be spread across two or more separate security applications, such as is shown in FIG. 1.

Figure 3:
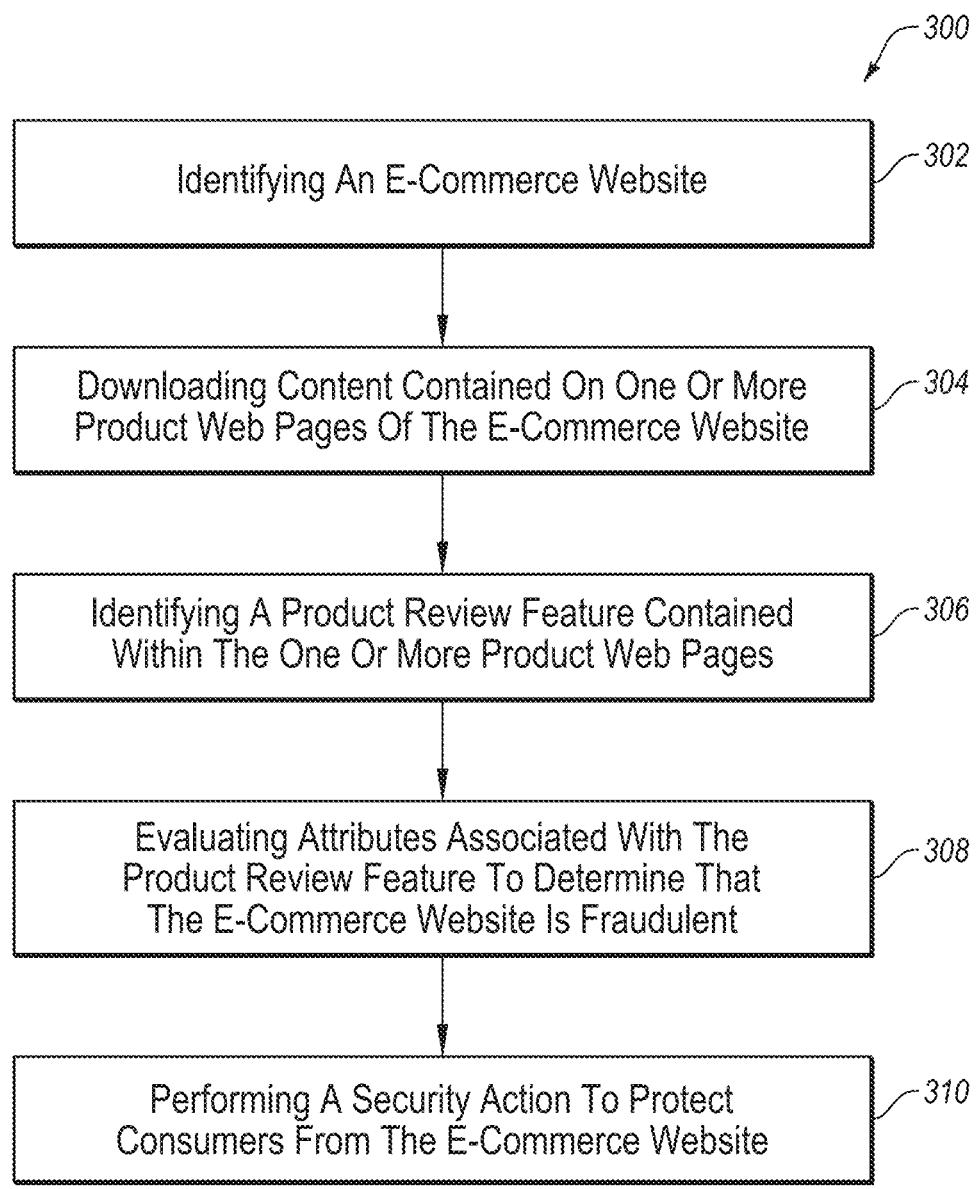
FIG. 3 is a flowchart of an example method for detecting fraudulent e-commerce websites.

FIG. 3 is a flowchart of an example method 300 for detecting fraudulent e-commerce websites. The method 300 may be performed, in some embodiments, by a device or system, such as by the security applications 114 or 126 of FIG. 1 or the security application 200 of FIG. 2. In these and other embodiments, the method 300 may be performed by one or more processors based on one or more computer-readable instructions stored on one or more non-transitory computer-readable media.

The method 300 may include, at action 302, identifying an e-commerce website. Websites may be identified as e-commerce websites based on the presence of features, such as a shopping cart feature or other features commonly associated with e-commerce websites.

The method 300 may include, at action 304, downloading content contained on one or more product web pages of the e-commerce website. In some embodiments, the content downloaded contained on the one or more product web pages may include images and hypertext markup language (HTML) code. In some embodiments, the content contained on the one or more product web pages of the e-commerce website may be downloaded by crawling and indexing the content contained on the one or more product web pages. In some embodiments, a headless browser may be used to crawl the e-commerce website.

The method 300 may include, at action 306, identifying a product review feature contained within the one or more product web pages. In some embodiments, the product review feature may be identified through one or more visual cues, such as a logo of a third-party review platform or a customer review box or a rating scale visual. A rating scale, for example, may include stars or graphs or some other visual depiction of a rating scale.

Figure 4:
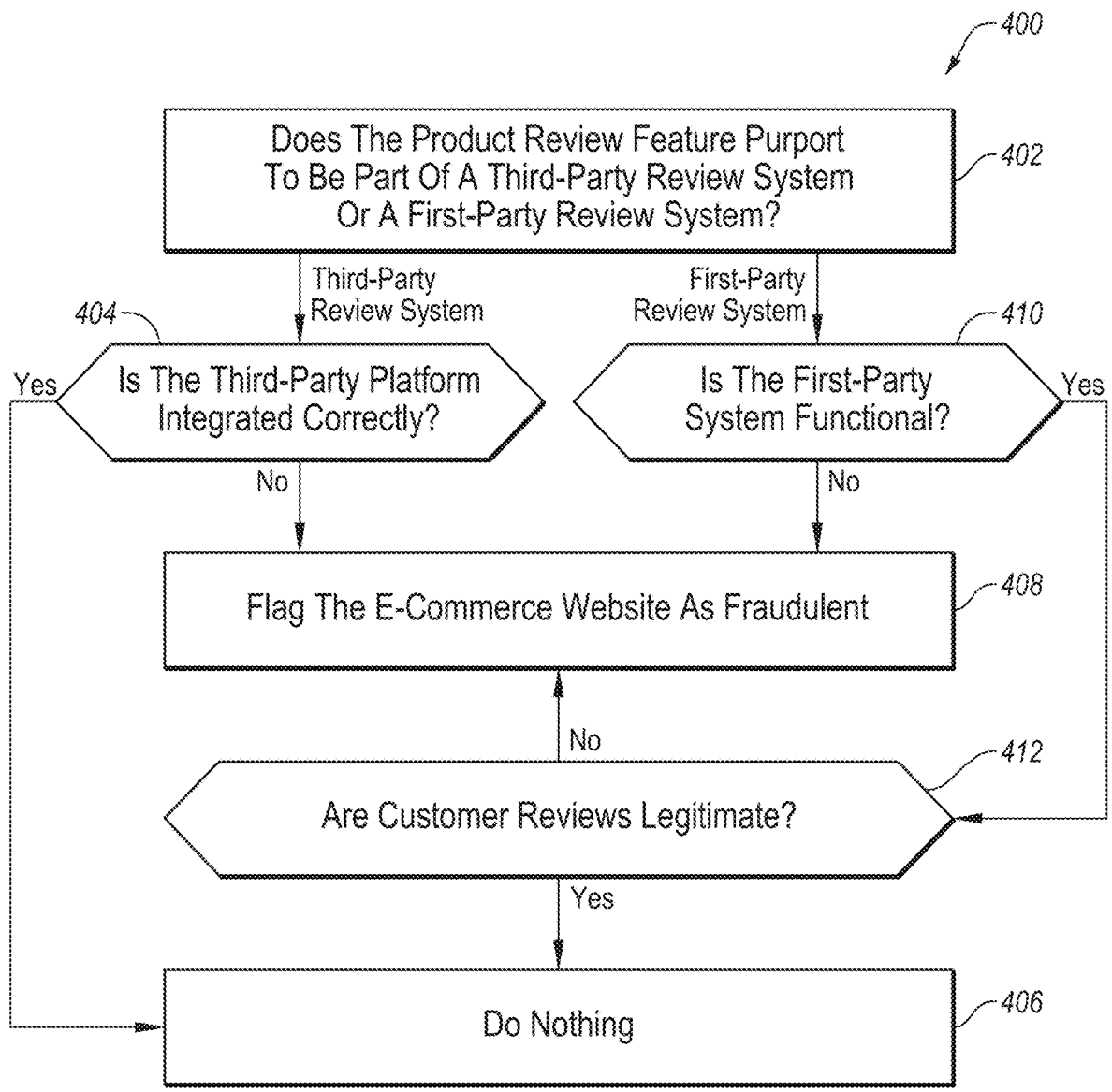
FIG. 4 is a flowchart of an example method for evaluating attributes associated with the product review feature to determine whether the e-commerce website is fraudulent.

The method 300 may include, at action 308 evaluating attributes associated with the product review feature to determine that the e-commerce website is fraudulent. Many different attributes may be evaluated to determine whether the e-commerce website is fraudulent. For example, FIG. 4 is a flowchart of an example method 400 for evaluating attributes associated with the product review feature to determine whether the e-commerce website is fraudulent. Turning to FIG. 4, in a first step 402, whether the product review feature purports to be part of a third-party review system or a first-party review system may be determined. Third-party review systems may include a logo of a third-party review platform or a link to a third-party review platform website. First-party review systems may include an apparent customer review box where a review for a product may be entered and submitted to the e-commerce website.

If a third-party review system is identified, whether the e-commerce website integrates the third-party review platform correctly can be determined in step 404. In legitimate e-commerce websites that integrate third-party review systems properly, a widget may pull the latest review score and a subset of the most recent reviews from the third-party review platform application programming interface (API) during each load of the e-commerce website. Integration with the third-party review platform is not functional if the e-commerce website fails to make a request to the third-party review system, or if a requested uniform resource locator (URL) lacks a domain of the e-commerce website. If the third-party review platform is integrated correctly, inquiry may end at step 406 without any further action being taken. However, if the third-party review platform is not integrated correctly, the e-commerce website may be flagged as fraudulent in step 408.

If a first-party review system is identified, whether the first-party review system is functional is determined in step 410. A first-party review system is not functional if a review submission feature is inoperable. If the first-party platform is not functional, the e-commerce website may be flagged as fraudulent in step 408. Alternatively, if a submission link is found to be operable, a bot may be used to interact with the review system and verify that capability of sending reviews to the website owners. If the submission link is not capable of sending a review to the website owners, the e-commerce website may be flagged as fraudulent in step 408.

However, if the first-party platform is functional, whether the customer reviews are legitimate is determined in step 412. A number of different attributes from a plurality of reviews may be evaluated to determine whether the reviews are legitimate. In some embodiments, when a ratio of high rated reviews to low rated reviews exceeds a threshold, the reviews may be determined to be illegitimate. In some embodiments, when an average length of the plurality of reviews falls below a threshold, the reviews may be determined to be illegitimate. In some embodiments, when a level of similarity of the plurality of reviews exceeds a threshold, the reviews may be determined to be illegitimate. In some embodiments, when a level of grammatical accuracy of the plurality of reviews falls below a threshold, the reviews may be determined to be illegitimate. If the reviews are found to be illegitimate, the e-commerce website may be flagged as fraudulent at step 408. Alternatively, if the reviews are found to be legitimate, the inquiry may end at step 406 without any further action being taken.

Turning back to FIG. 3, when a determination that the e-commerce website is fraudulent has be made, the method 300 may include, at action 310, performing a security action to protect consumers from the e-commerce website. In some embodiments, the security action may include providing a notice to a customer attempting to contact the e-commerce website that the e-commerce website may be fraudulent, preventing a customer from accessing the e-commerce website, and/or preventing a customer from making any purchases from the e-commerce website.

Although the actions of the methods 300 and 400 are illustrated in FIGS. 3 and 4 as discrete actions, various actions may be divided into additional actions, combined into fewer actions, reordered, expanded, or eliminated, depending on the desired implementation. Further, it is understood that the method 300 may improve the functioning of a computer system itself. It is common for fraudulent e-commerce websites to also be associated with various types of malware, spyware, and tracking domains. Therefore, merely visiting these sites may degrade the functionality of a computing system. Receiving a notification to avoid these fraudulent e-commerce websites, or being prevented from visiting them, will therefore protect, and thus improve, the functionality of a computing device.

Also, the methods 300 and 400 may improve the technical field of fraudulent e-commerce website detection. Fraudulent e-commerce websites are a problem that is unique to the Internet and the solution provided herein is necessarily rooted in computer technology. When consumers purchase a product from a brick-and-mortar store, they are able to physically assess the product before making a purchasing decision. When buying something from a website, however, consumers are not able to physically assess the product until after the purchase is made and the product has been shipped to the customer (to the extent that a product is even actually shipped). This difference between online and brick-and-mortar stores is responsible for the fraud that is addressed in this disclosure. Identifying fake review systems is a fast and efficient way to identify fraudulent e-commerce websites and a significant improvement over other methods currently used to perform the same task.

Because the problem addressed herein in unique to an online environment, several steps recited in the methods 300 and 400 are steps that only make sense in the realm of computer networks. For example, evaluating attributes associated with the product review feature as per step 308 may, in one embodiment, include determining whether the e-commerce website integrates a third-party platform correctly (step 404), and, in another embodiment, include whether a first-party system is functional (step 410). These determinations may be made by evaluating source code and requests made during a load phase of the e-commerce website, which are concepts unique to computer networks.

FIG. 5 illustrates an example computer system 500 that may be employed in detecting fraudulent e-commerce websites. In some embodiments, the computer system 500 may be part of any of the systems or devices described in this disclosure. For example, the computer system 500 may be part of any of the user device 104, the e-commerce server 106, the third-party review server 108, and the security server 110 of FIG. 1.

The computer system 500 may include a processor 502, a memory 504, a file system 506, a communication unit 508, an operating system 510, a user interface 512, and an application 514, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 502 may include any suitable special-purpose or general-purpose computer, computing entity, or processing device including various computer hardware or software applications and may be configured to execute instructions stored on any applicable computer-readable storage media. For example, the processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 502 may interpret and/or execute program instructions and/or process data stored in the memory 504 and/or the file system 506. In some embodiments, the processor 502 may fetch program instructions from the file system 506 and load the program instructions into the memory 504. After the program instructions are loaded into the memory 504, the processor 502 may execute the program instructions. In some embodiments, the instructions may include the processor 502 performing one or more of the actions of the methods disclosed herein.

The memory 504 and the file system 506 may include computer-readable storage media for carrying or having stored thereon computer-executable instructions or data structures. Such computer-readable storage media may be any available non-transitory media that may be accessed by a general-purpose or special-purpose computer, such as the processor 502. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 502 to perform a certain operation or group of operations, such as one or more of the actions of the methods disclosed herein. These computer-executable instructions may be included, for example, in the operating system 510, in one or more applications, such as the security applications 114 and 126 of FIG. 1, the security application 200 of FIG. 2, or in some combination thereof.

The communication unit 508 may include any component, device, system, or combination thereof configured to transmit or receive information over a network, such as the network 102 of FIG. 1. In some embodiments, the communication unit 508 may communicate with other devices at other locations, the same location, or even other components within the same system. For example, the communication unit 508 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, a cellular communication device, etc.), and/or the like. The communication unit 508 may permit data to be exchanged with a network and/or any other devices or systems, such as those described in the present disclosure.

The operating system 510 may be configured to manage hardware and software resources of the computer system 500 and configured to provide common services for the computer system 500.

The user interface 512 may include any device configured to allow a user to interface with the computer system 500. For example, the user interface 512 may include a display, such as an LCD, LED, or other display, that is configured to present video, text, application user interfaces, and other data as directed by the processor 502. The user interface 512 may further include a mouse, a track pad, a keyboard, a touchscreen, volume controls, other buttons, a speaker, a microphone, a camera, any peripheral device, or other input or output device. The user interface 512 may receive input from a user and provide the input to the processor 502. Similarly, the user interface 512 may present output to a user.

The application 514 may be one or more computer-readable instructions stored on one or more non-transitory computer-readable media, such as the memory 504 or the file system 506, that, when executed by the processor 502, is configured to perform one or more of the actions of the methods disclosed herein. In some embodiments, the application 514 may be part of the operating system 510 or may be part of an application of the computer system 500, or may be some combination thereof. In some embodiments, the application 514 may function as any one of the security applications 114 and 126 of FIG. 1 and the security application 200 of FIG. 2.

Modifications, additions, or omissions may be made to the computer system 500 without departing from the scope of the present disclosure. For example, although each is illustrated as a single component in FIG. 5, any of the components 502-514 of the computer system 500 may include multiple similar components that function collectively and are communicatively coupled. Further, although illustrated as a single computer system, it is understood that the computer system 500 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 502 of FIG. 5) including various computer hardware or software applications, as discussed in greater detail below. Further, as indicated above, embodiments described herein may be implemented using computer-readable media (e.g., the memory 504 or file system 506 of FIG. 5) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements.

The foregoing description, for purpose of explanation, has been described with reference to specific embodiments.

However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for detecting fraudulent e-commerce websites, at least a portion of the method being performed by a computing device comprising one or more processors, the method comprising:
identifying an e-commerce website;
downloading content contained on one or more product web pages of the e-commerce website;
identifying a product review feature contained within the one or more product web pages;
determining whether the product review feature is a first-party review system or a third-party review system;
evaluating attributes associated with the product review feature to determine that the e-commerce website is fraudulent, wherein at least one of the evaluated attributes are evaluated based on whether the product review feature is a first-party review system or a third-party review system; and
performing a security action, via a user device, based on the determination that the e-commerce website is fraudulent, the security action including at least one of:
providing a notification on the user device indicating that the e-commerce website may be fraudulent;
preventing access to the e-commerce website; or
preventing purchases from the e-commerce website.

2. The method of claim 1, wherein the content downloaded contained on one or more product web pages includes images and hypertext markup language (HTML) code.

3. The method of claim 1, wherein the content contained on the one or more product web pages of the e-commerce website is downloaded by crawling and indexing the content contained on the one or more product web pages.

4. The method of claim 3, wherein a headless browser is used to crawl the e-commerce website.

5. The method of claim 1, wherein the product review feature is identified through one or more visual cues.

6. The method of claim 5, wherein the visual cues include a logo of a third-party review platform or a customer review box or a rating scale visual.

7. The method of claim 6, wherein the ratings scale visual includes one or more stars.

8. The method of claim 1, wherein:
the product review feature is determined be the third-party review system,
the attributes evaluated include an integration with a third-party review platform, and
the e-commerce website is determined to be fraudulent when an integration with the third-party review platform is nonfunctional.

9. The method of claim 8, wherein the integration with the third-party review platform is nonfunctional when a request is not made to the third-party review system or when a requested uniform resource locator (URL) lacks a domain of the e-commerce website.

10. The method of claim 1, wherein:
the product review feature is determined to be the first-party review system,
the attributes evaluated include a functionality of a review submission feature, and
the e-commerce website is determined to be fraudulent when the review submission feature is inoperable.

11. The method of claim 10, wherein the review submission feature lacks a review submission link.

12. The method of claim 1, wherein:
the product review feature includes a plurality of reviews,
the attributes evaluated include a ratio of high rated reviews to low rated reviews, and
the e-commerce website is determined to be fraudulent when the ratio of high rated reviews to low rated reviews exceeds a threshold.

13. The method of claim 1, wherein:
the product review feature includes a plurality of reviews,
the attributes evaluated include an average length of the plurality of reviews, and
the e-commerce website is determined to be fraudulent when the average length of the plurality of reviews falls below a threshold.

14. The method of claim 1, wherein:
the product review feature includes a plurality of reviews,
the attributes evaluated include a level of similarity of the plurality of reviews, and
the e-commerce website is determined to be fraudulent when the level of similarity of the plurality of reviews exceeds a threshold.

15. The method of claim 1, wherein:
the product review feature includes a plurality of reviews,
the attributes evaluated include a level of grammatical accuracy of the plurality of reviews, and
the e-commerce website is determined to be fraudulent when the level of grammatical accuracy of the plurality of reviews falls below a threshold.

16. The method of claim 1, wherein the security action includes providing a notification on the user device that the e-commerce website may be fraudulent.

17. The method of claim 1, wherein the security action includes preventing access to the e-commerce website.

18. The method of claim 1, wherein the security action includes preventing purchases from the e-commerce website.

19. One or more non-transitory computer-readable media comprising one or more computer-readable instructions that, when executed by one or more processors of a computing device, cause the computing device to perform a method for detecting fraudulent e-commerce websites, the method comprising:
identifying an e-commerce website;
downloading content contained on one or more product web pages of the e-commerce website;
identifying a product review feature contained within the one or more product web pages;
determining whether the product review feature is a first-party review system or a third-party review system;
evaluating attributes associated with the product review feature to determine that the e-commerce website is fraudulent, wherein at least one of the evaluated attributes are evaluated based on whether the product review feature is a first-party review system or a third-party review system; and performing a security action, via a user device, based on the determination that the e-commerce website is fraudulent, the security action including at least one of:
providing a notification on the user device indicating that the e-commerce website may be fraudulent;
preventing access to the e-commerce website; or
preventing purchases from the e-commerce website.

20. A computing device comprising:
one or more processors; and
one or more non-transitory computer-readable media comprising one or more computer-readable instructions that, when executed by the one or more processors, cause the computing device to perform a method for detecting fraudulent e-commerce websites, the method comprising:
identifying an e-commerce website;
downloading content contained on one or more product web pages of the e-commerce website;
identifying a product review feature contained within the one or more product web pages;
determining whether the product review feature is a first-party review system or a third-party review system;
evaluating attributes associated with the product review feature to determine that the e-commerce website is fraudulent, wherein at least one of the evaluated attributes are evaluated based on whether the product review feature is a first-party review system or a third-party review system; and
performing a security action, via a user device, based on the determination that the e-commerce website is fraudulent, the security action including at least one of:
providing a notification on the user device indicating that the e-commerce website may be fraudulent;
preventing access to the e-commerce website; or
preventing purchases from the e-commerce website.

* * * * *